United States Patent [19]
Saito et al.

[11] 4,306,259
[45] Dec. 15, 1981

[54] FLEXIBLE-DISC DRIVE SPINDLE ASSEMBLY WITH BRUSHLESS DC MOTOR

[75] Inventors: Hiroshi Saito, Hasuda; Hiroshi Hagino, Omiya; Kuniyoshi Nakamura; Eiitchi Kotake, both of Yono; Hiroshi Udagawa, Kiryu, all of Japan

[73] Assignee: Japan Servo Co., Tokyo, Japan

[21] Appl. No.: 85,986

[22] Filed: Oct. 18, 1979

[30] Foreign Application Priority Data

Jun. 25, 1979 [JP] Japan .................. 54-079048

[51] Int. Cl.³ ........................................ G11B 23/00
[52] U.S. Cl. ........................... 360/99; 360/133
[58] Field of Search .................... 360/97-99, 360/102-103, 133, 135, 86, 128; 310/268, 181

[56] References Cited
U.S. PATENT DOCUMENTS

| | | | |
|---|---|---|---|
| 3,577,133 | 5/1971 | Garfein et al. | 360/97 |
| 3,706,085 | 12/1972 | Mowrey et al. | 360/97 |
| 4,005,490 | 1/1977 | Duncan et al. | 360/97 |
| 4,101,945 | 7/1978 | Butsch | 360/102 |
| 4,216,512 | 8/1980 | Vidwans | 360/97 X |

*Primary Examiner*—John H. Wolff
*Attorney, Agent, or Firm*—Birch, Stewart, Kolasch & Birch

[57] ABSTRACT

The driving system which drives and rotates a flexible-disc to and from which information is written in and read out by means of a magnetic head. On the top of a driving hub the flexible-disc is attached in a detachable manner, and at the bottom part of the driving hub a driving axle is directly connected coaxially. The lower end of this driving axle itself forms the rotating axle of a direct current magnetic motor. The rotation of this motor is controlled by a rotating speed controlling system so as to rotate at speed identical to any given designated velocity.

7 Claims, 10 Drawing Figures

FLEXIBLE-DISC DRIVE SPINDLE ASSEMBLY WITH BRUSHLESS DC MOTOR

BACKGROUND OF THE INVENTION

The present invention relates to a flexible-disc driving system which drives and rotates a flexible-disc to and from which information signals are written in and read out by means of a magnetic head.

The flexible-disc, sometime being called floppy disc, is a magnetic disc made of a polyester plate of about 80 μm thick both sides of which are coated with a layer of magnetic iron oxide and which is encased in a cover about 20 cm square made of vinyl chloride or any other similar material and which is used for an information memory system as a peripheral device of electronic computers.

Figure 1:
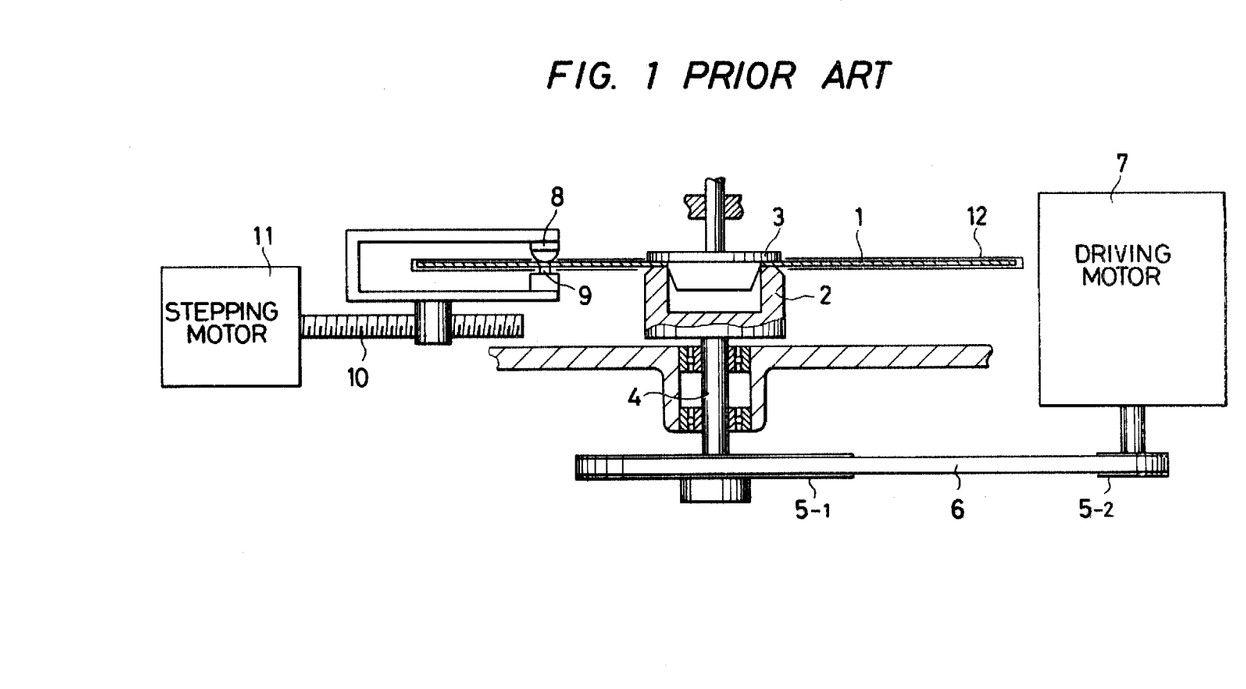
FIG. 1 is the cross-section to help explain the outline of a conventional system.

A patent disclosure dealing with the data storage apparatus employing a single magnetic disc is found in U.S. Pat. No. 3,678,481. A conventional system is outlined hereunder as illustrated in FIG. 1. In FIG. 1, 1 is the flexible-disc (hereinafter simply called disc), 2 is the driving hub, 3 is a centering cone and 4 is the driving axle, while the disc 1 is attached on the top of the driving hub by the centering cone in a detachable manner and the driving hub 2 is directly connected to the driving axle coaxially, wherein these elements 1, 2, 3 and 4 are designed to rotate together in one piece.

The driving axle 4 is driven by the driving motor 7 by way of pulleys 5-1 and 5-2 and belt 6. The magnetic head 8 for write-ins and read-outs and the pad 9 are arranged in a position so as to hold the disc 1 in between them. It is so structured that write-ins and read-outs are made by the magnetic head 8 and the pad 9 which are pressed against the disc 1 and in contact with the recording surface when the actuator (no drawing attached) that consists of a solenoid and other parts is excited by way of receiving head load instructions. The magnetic head 8 can also be driven back and forth toward the center of the disc 1 by means of a mechanism composed of the lead screw 10 and the stepping motor 11, whereby access to the recording track on the surface of the disc 1 is being made, 12 is a protecting cover of the disc 1 made of vinyl chloride which is, though not indicated in the drawing, held in a fixed position while the disc is rotating and has an oblong opening for write-in and read-out of information as well as for access to the recording track.

Generally, for the driving motor 7 an alternating current synchronous motor is employed, and is set to rotate the disc 1 at a given speed (e.g. 360 rpm).

The conventional system with the above structure, however, involves various problematic points as will be dealt with in the following. Although the disc 1 has to maintain an even revolution at a given rotation speed to improve the reliability in the behavior of write-in and read-out of information, the driving system which comprises an A.C. synchronous motor as well as a belt and pulley arrangement possesses the following shortcomings. First, as an A.C. synchronous motor rotates at a revolution speed proportionated to the frequency of the power source, its speed varies in accordance with the variation of the power source frequency. Next, in order to secure interchangeability between each driving system or each disc to which information has been written in, the revolution speed of the disc of each driving system is required to fall within a limited bracket of certain deviation values, so that a high processing accuracy is required for the belt and pulleys. In addition, in case of a manufacturer who manufactures these systems for districts where different power source frequencies are prevailing, he may have to make the sets of this system for each different frequency, or may have to produce the system in a way which facilitates replacement of the belt and pulleys that fit to the designated frequency. Furthermore, on account of the voltage difference by countries, on the part of the voltage difference by countries, on the part of manufacturers, separate motors which fit to each different voltage are to be provided.

Observing the uneven revolution characteristics next, the conventional system has the following inconveniencies. The variation in the load such as the frictional resistance between the disc 1 and the cover 12 as well as the frictional resistance at the contacting points of the magnetic head 8 and the pad 9 with the disc 1, and the instantaneous variation of the power source voltage give a transient variation to the revolution speed of the disc 1, namely an uneven revolution. The causes of an uneven revolution are, other than the above variation in load, asymmetrical winding of the synchronous motor, an uneven gap of the magnetic circuit due to a lack of uniformity in slots and magnetic anisotropy of the rotor. In general, the uneven revolution which is caused by a sharp up or down of the load torque of a synchronous motor results a damped oscillation. The driving system which employs a belt and pulley arrangement also is a great cause for vibration. As a means to minimize uneven revolution, a flywheel is usually employed in order to maximize the moment of load inertia against the motor, but it accompanies such disadvantages as an increased cost and weight for the flywheel and an extended time required for start-up. In this case, the range of the speed variation gets narrower though, the damping time gets longer. As other ways to minimize uneven revolution, synchronizing torque of the synchronous motor could be made larger, or viscous resistance of the driving system could be increased, but any of these adjustments results in such disadvantages as a larger size of the motor or wide changes in the basic characteristics of the motor itself.

BRIEF SUMMARY OF INVENTION

The objective of the present invention is to solve the above various problems involved in the conventional system and to dispense with an A.C. synchronous motor by employing a direct current driving system, whereby making available a flexible-disc driving system of an improved operating features with a simple structure entirely free from the effects of the variation in the voltage and frequency of the alternating current power source.

The characteristic point of the present invention, in order to achieve the above objectives, is the structure in which a D.C. brushless motor directly, connects the rotor magnet to the driving hub or driving axle, and the noiseless disc driving system which has less uneven revolution and easy to handle on account of its simple structure, without necessitating a driving system comprising an A.C. motor as well as a belt and pulley arrangement by incorporating a velocity servo system which combines a D.C. brushless motor with a velocity detector and a velocity control circuit, whereby facilitating to materialize the special features required for the system through the design of its servo system. Further, the present invention is characterized in its bearing mechanism in which two sets of ball-bearings are installed one each on the upper side and the lower side of the spring whereby putting a pre-load to the ball-bearings by taking advantage of the magnetic attractive force between the rotor magnet and the yoke as well as the spring power of the aforementioned spring while preventing vibration and noise, and, furthermore, it is characterized in the structure to disperse the heat efficiently through the motor mounting frame and at the same time to basically reduce the input power to the motor by installing a velocity control circuit, in order to prevent the disc from being heated up by the heat generated at the motor and the heat being conducted through the driving hub.

DESCRIPTION OF INVENTION IN RELATION TO DRAWINGS

Figure 2:
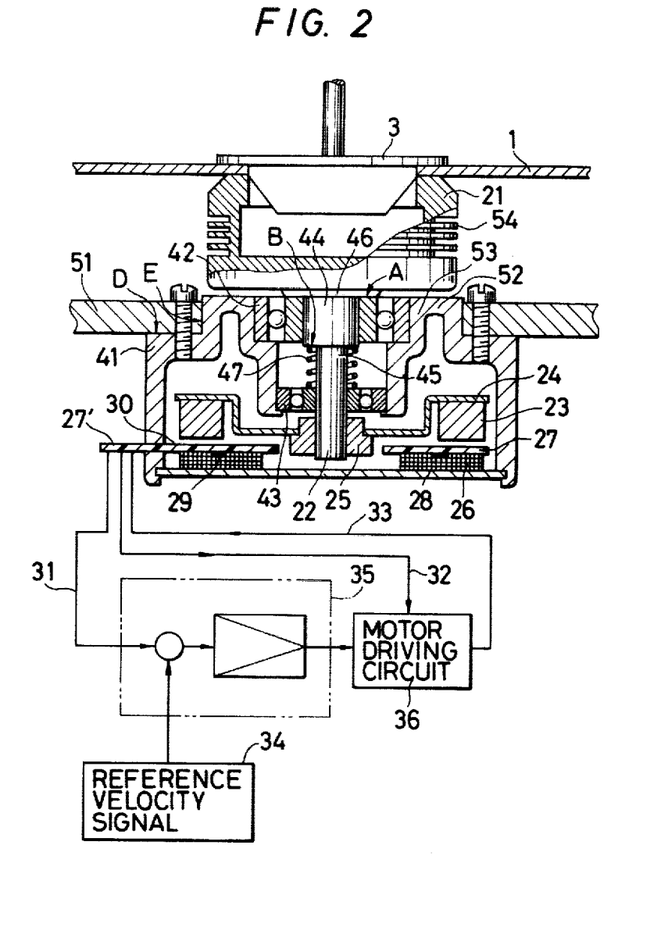
FIG. 2 is a cross-section showing the structure of the control circuit block to explain one example of the present invention.

In FIG. 2, the driving hub 21, the driving axle 22 and the rotor magnet 23 are illustrated. On top of the driving hub, the disc 1 is mounted by the centering cone 3 in a detachable way, while the driving axle 22 is directly connected co-axially to the driving hub 21 at its bottom. The elements 1, 3, 21 and 22 are designed to rotate together in one piece. The rotor magnet is made in a shape of ring one side of which is fixed on the rotor frame 24, and this rotor frame 24 is attached to the driving axle 12 by means of the bushing 25 so as to rotate with the driving axle 22 in one piece. The rotor magnet is magnetized with multiple poles (for example, 8 poles). The stator coil 26 is attached to the printed circuited plate both of which are mounted on the yoke 28 so as to position the face of the printed circuited plate 27 against the magnetic pole of the rotor magnet with a slim gap in between. Torque is generated between this stator coil 26 and the rotor magnet 23 by which the driving axle is driven to rotate.

Figure 3:
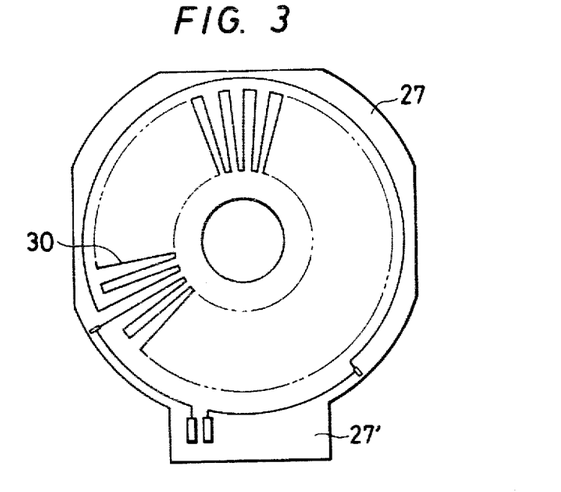
FIG. 3 shows the top side of the printed base board 27 of FIG. 2.
Figure 4:
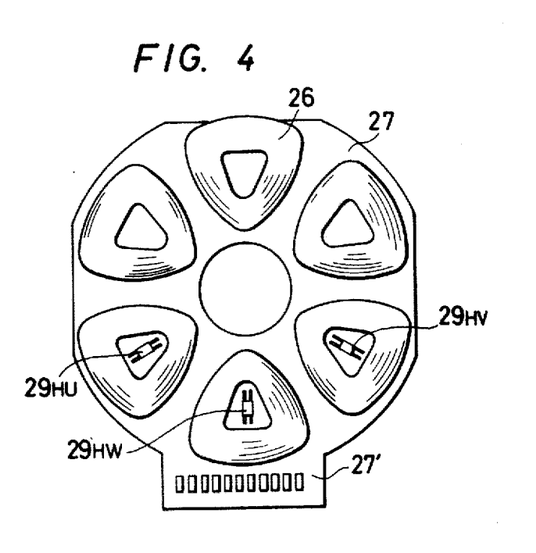
FIG. 4 is the reverse side of the printed base board 27 of FIG. 2.

Here an explanation is made as to one example of the printed base board by way of FIG. 3 and FIG. 4. FIG. 3 is the top view and FIG. 4 is the bottom view. One the top side (magnet side) of the printed base board, there is printed the conductor pattern circuit 30 with a radial and comb-shaped pattern which acts as a speed detector jointly with the rotor magnet which generates detected speed signals 31 (ref. FIG. 2) through the terminal part 27' of the printed circuited plate 27. On the bottom side (facing the stator coil side), the pattern for connecting the lead-outs of the stator coil 26 and the pattern for installing the Hall element 29 for detecting the rotating magnetic pole position of the rotor magnet 23 are printed, and each of them is connected to the outer coil lead 33 (ref. FIG. 2) and the magnetic pole position signal 32 (ref. FIG. 2) respectively.

Returning back to FIG. 2, the reference speed signal 34 for the disc rotation drive, the comparator amplifier circuit 35 which compares and amplifies this reference speed signal 34 and the detected speed signal 31 and the motor driving circuit 36 which generates an exciting current that supplies the output signal from the comparator amplifier circuit 35 and the pole position signal received as input to the stator coil 26 are illustrated. In addition, a motor case 41 to which a first ball-bearing 42 is mounted in the center of its top side (The side facing the driving hub) on the side of the driving hub mounting, and also at the center of its bottom end a second ball-bearing 43 are provided. On the driving axle 22, two stepped-down parts are provided, and the diameter is larger on the driving hub side while it is smaller on the bushing 25 side. The first ball-bearing 42 is bearing the medium diameter part while the second ball-bearing is supporting the smaller diameter part 45 of the driving axle 22 respectively. The upper end of the inner ring of the first ball-bearing is in contact and connected with the stepped-down part of the largest diameter part 46 side of the driving axle, and the spring 47 which is capable of extending and contracting axlewise is equipped between the top side of the second ball-bearing, as illustrated, and the upper end of the stepped-down part of the smaller diameter part 45 on the driving axle 22. The motor mounting frame 51 which is in contact with the motor case 41 at points D and E respectively as shown in the drawing. The connecting part 52 of E is the mounting point of the motor case 41 to the motor mounting frame 51 and the outer mounting part 53 of the first ball-bearing 42, and provides a structure to reduce the thermal conductivity (for instance, a thinner wall structure). The cooling fins 54 installed around the body part of the driving hub 21.

In the aforementioned structure, the Hall element 29 emits a magnetic pole position signal 32 corresponding to the rotating position of the rotor magnet 23 and at the motor driving circuit the direction of the excited current which flows into the stator coil 26 is automatically switched back and forth, whereby regulating the torque which drives the rotor magnet to rotate in one direction. The conductor pattern 30 provided on the printed circuited plate 27 detects the rotating speed of the rotor magnet 23 and generates the detected speed signal 31. This detected speed signal 31 is compared and amplified respectively with the reference speed signal 34 and by the comparator amplifier circuit 35, and the output of the deviation signal therefrom is put in to the motor driving circuit, which automatically switches back and forth this input deviation signal in accordance with the magnetic pole signal 32 to distribute and supply it to each stator coil 26, whereby it is designed to keep the rotation of the rotor magnet 23 at a given rotation speed corresponding to the reference velocity signal 34; in short, it composes a velocity servo system.

Accordingly, the stator coil 26 is supplied with only the minimum power enough to maintain rotation, so that the temperature rise throughout the whole system is kept minimum. The rotation performance of the system can optimize its characteristic features by means of a speed control circuit composed of an easy-to-design electronic circuit or a compensating circuit which can be added if necessary, and it can be much easily adjusted to meet the required performance, in contrast with the manner of adjustment by modifying the structure of features of the A.C. synchronous motor itself or by modifying the features of the mechanical system consists of a belt and pulley arrangement, as seen in the conventional system. Further, as it can operate on a D.C. power source, it is free from the effects of fluctuating frequency and voltage of an A.C. power source, and no care is required for any inductive disturbance to other signal circuits since no A.C. power source is led into the system.

Figures 5, 6:
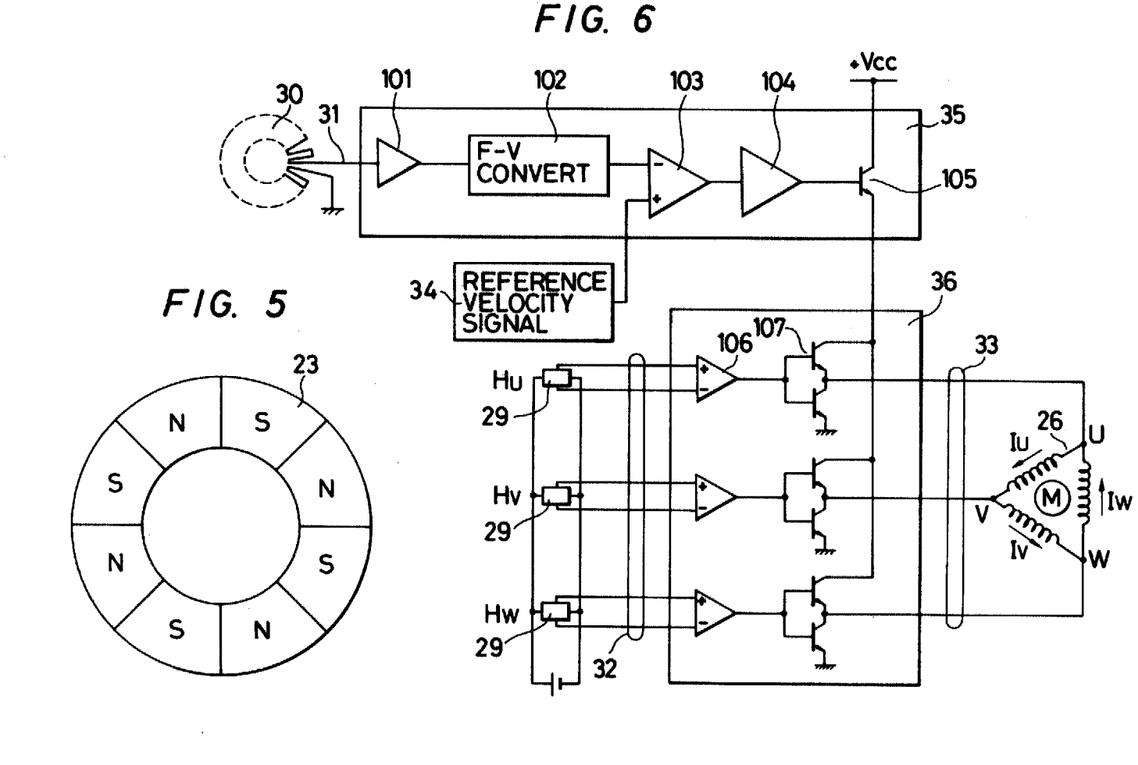
FIG. 5 is the top view of the rotor magnet shown in FIG. 2.
FIG. 6 is a drawing of one example of the comparator amplifier circuit 35 and the motor driving circuit 36.
Figure 7:
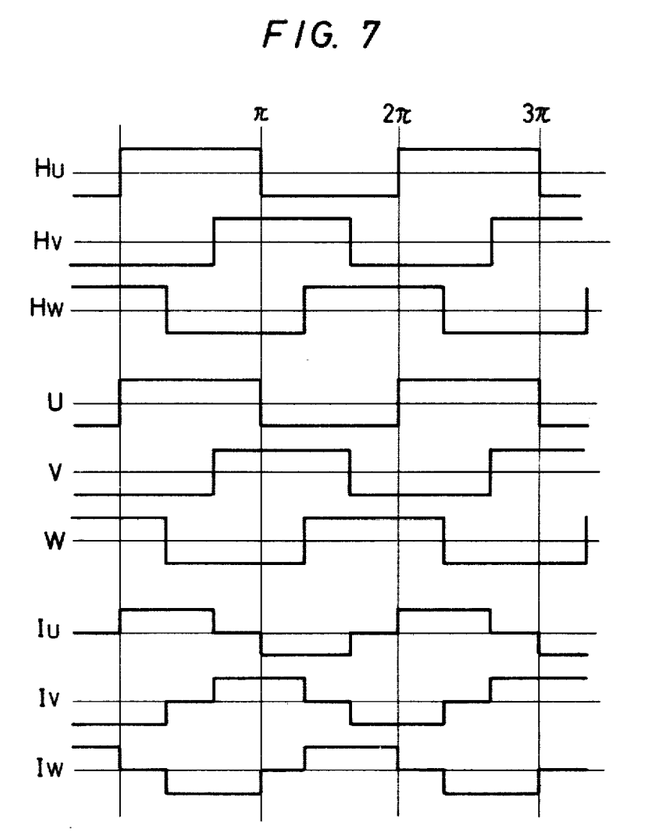
FIG. 7 is the time chart of signals from various parts shown in FIG. 6.

If the voltage of the D.C. power source for driving the system is made identical to that of the power source for the stepping motor for the magnetic head access, the structure of the power source can be simplified. Referring to FIG. 5 through FIG. 7, the controlling behavior of this velocity servo system is detailed hereunder. FIG. 5 is the drawing showing the multi-pole magnetization (8 poles in the example quoted in FIG. 5) of rotor magnet 23, and FIG. 6 is the drawing for one example of the control circuit, while FIG. 7 is the time chart of the signals generated by various parts of the circuit shown in FIG. 6. As shown in FIG. 4, the stator coil 26 is mounted at 6 spots along the same circle with the same distance from the neighboring two, and the two coils facing each other across the center are connected in series, forming three-phase coils of U, V and W. The number of the conductor pattern 30 embedded on the printed circuited plate 27 as shown in FIG. 3 shall be an odd number multiple of the number of the magnetic poles, 8, of the rotor magnet 23 (ref. Toku-Gan-Sho 50-126,441). In FIG. 6, the amplifier 101 which amplifies the detected speed signal 31, the F-V converter 102 which converts the frequency signal of the amplifier output into voltage signal, the comparator 103 which compares the output deviation signal of the F-V converter 102 with the reference speed signal 34, and the current control amplifier 104 which controls the input current of the transistor 105 upon receiving the output signal of comparator are illustrated wherein all of these elements 101 through 105 compose the comparator amplifier circuit 35. On the other hand, the Hall element 29 for magnetic pole position detection, as shown in the time chart illustrated in FIG. 7, generates the magnetic pole position signals 32 (Hu, Hv and Hw) which are electrically 120° apart from each other, and this magnetic pole position signal 32 generates the coil terminal voltage U, V and W after channelling through the motor driving circuit 36 which consists of the operation amplifier 106 and the group of the transistor 107. At the same time, this group of the transistor 107 is controlled by the output transistor 105 of the comparator amplifier circuit 35, the values of the coil current $I_u$, $I_v$ and $I_w$ are controlled in accordance with the rotating speed of the conductor pattern 30 and the currents are switched with 120 electrical degree space from each other, whereby speed control by brushless driving is performed.

Returning back to FIG. 2, simultaneously with the rotor magnet 23 generating torque in between the stator coil, the rotor magnet 23 is attracted toward the yoke 28 by the attractive force generated in between the yoke 28. Therefore, the driving axle 22 fixed to the rotor magnet 23 is attracted toward the yoke 28, and this force is being sustained by the inner ring of the first ball-bearing at the point A of the driving axle 22. This attractive force between the rotor magnet 23 and the yoke 28 is the pre-load given to the first ball-bearing 42.

On the other hand, the second ball-bearing 43 is being pushed downward, as shown in the drawing, by the spring force of the spring 47 actuated from the point B of the driving axle 22, so that a pre-load is given to the inner ring of the second ball-bearing.

The heat generated at the stator coil 26 is first conducted to the yoke 28, and further to the motor case 41, and then through the contacting points D and E with the motor mounting frame, it will be dispersed into the atmosphere from the motor mounting frame 51 as a heat sink which has a greater thermal capacity.

In this point, in order to prevent heat conduction to the driving axle 22, the wall thickness of the member connecting the mounting part 53 of the outer ring of the first ball-bearing 42 and the motor case 41 could be reduced in thickness so as to make it a structure having a lesser thermal conductivity. Furthermore, in order not to permit the heat which was conducted to the driving axle to be easily conducted to the upper surface F of the driving hub 21, the fins 54 can be installed around the body of the driving hub 21 so as to structure it to facilitate heat dispersion by the air flow generated by the rotation of the driving hub 21.

Figure 8:
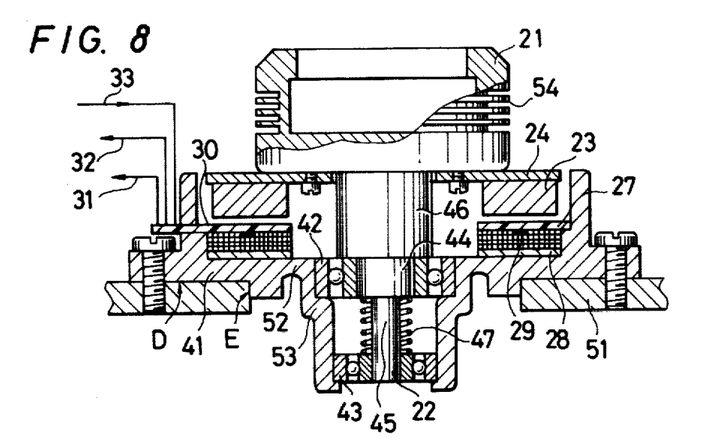
FIG. 8, FIG. 9 and FIG. 10 are the cross-sections showing other examples of the present invention respectively.

FIG. 8 is a cross-section which shows another example of the present invention. The rotor magnet 23 is fixed on the rotor frame 24, which is directly mounted on to the bottom part of the driving hub 21 so as to rotate together with the driving hub as one piece. Also the motor mounting frame 51 is positioned below this assembly. Other structures and functions remain unchanged from the example shown in FIG. 2.

Figure 9:
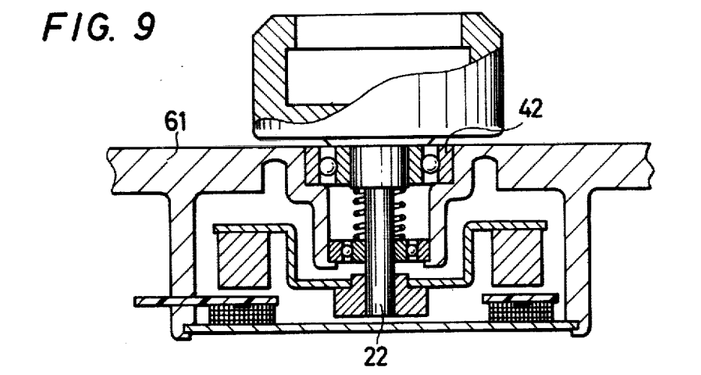
Figure 10:
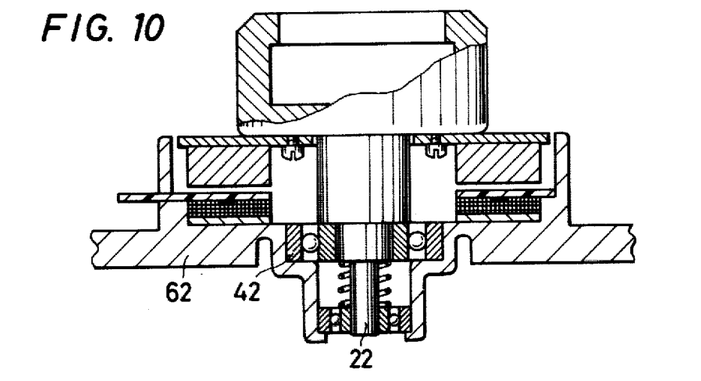

FIG. 9 and FIG. 10 are cross-section drawings showing further examples of the present invention, wherein the motor case 41 and motor mounting frame 51, shown in FIG. 2 and FIG. 8 respectively, are composed in the solid one-piece structures 61 and 62 respectively, in which the frames 61 and 62 are made of a material having a high thermal conductivity and simultaneously a part which has a thinner wall thickness is provided in the neighborhood of the supporting part of the first ball-bearing, whereby it is designed to prevent easy heat conduction to the driving hub 22. Thus by making the motor case itself and the motor mounting frame into a solid one-piece structure, the frames 61 and 62 concurrently possess a function as a structure for the motor stator as well as functioning as a heat sink, which simplifies the structure of the whole system and gives an advantage of facilitating compactness and reducing the weight of the system. As dealt with in the above, according to the present invention, as it has a structure wherein the driving hub to which a flexible-disc is mounted is directly driven by a D.C. brushless motor, it does not require any driving system consisting of an A.C. synchronous motor belt or pulleys but it facilitates an easy rotation performance as desired by means of a speed control circuit, and can reduce drastically uneven revolution as compared with the conventional system. Also, as its structure does not employ any belt or pulley, and does not contain any mechanical parts which require a high processing accuracy, the present invention provides a simple mechanical structure with less speed change due to wear of a conventional belt, and reduces upkeep and maintenance. Further, since it does not work on an A.C. power source, no care is necessitated for different frequency and fluctuation in frequency of A.C. power source, and different voltage and voltage fluctuation. Eliminating the need for A.C. power in the system frees the system from any inductive disturbance to any other signal circuit involved therein. If, as for the D.C. power source for driving, the same voltage is employed as that of the D.C. power source for the stepping motor for magnetic head access, the composition of the power source could be simplified. Further, the present invention puts a pre-load on the ball-bearings by a simplified structure thereby reducing irregular vibration and noise from the ball-bearings by the rotating driving axle and making it possible to improve the dependability as a magnetic recording system. Reduced consumption of unnecessary power derived from the speed control system employed which limits the generated heat and the application of an efficient heat dispersing formula to the motor mounting frame facilitates limiting temperature rise at the driving hub. It also enables further to restrict temperature rise at the driving hub, by attaching heat radiation fins around the driving hub if it is required. Furthermore, by incorporating the motor case and the motor mounting frame in a solid one-piece structure, it is possible to simplify the mechanical structure of the system and to make the system compact and light weight.

We claim:

1. A flexible-disc drive spindle assembly including a flexible-disc for storing information and a brushless DC motor having a shaft member for providing rotation of the flexible-disc, comprising in combination:
   - a driving hub having a top side on which a flexible-disc is mounted in a detachable manner and a bottom side;
   - a brushless DC motor having a casing and stator coils;
   - a driving shaft directly connected coaxially to said driving hub at said bottom side and being mounted within bearings positioned in a mounting frame in a manner permitting said driving shaft to rotate;
   - a ring-shaped rotor magnet being affixed to said driving shaft to rotate therewith and having multipole magnets disposed in a radial alignment;
   - a printed circuited plate being mounted to said casing of said motor by way of a yoke at a position facing said rotor magnet with a gap positioned in between, said printed circuited plate having a top side including a conductor pattern that detects the rotational speed of said rotor magnet and having a bottom side including magnetic pole position sensors mounted thereon for detecting the rotating magnetic pole position of said rotor magnet and stator coils of said motor;
   - a comparator amplifier circuit for generating amplified deviation signals by comparing the detected speed signal from said conductor pattern with a reference speed signal;
   - a motor driving means which distributes and supplies said stator coils with an excited current in response to said deviation signal upon receiving as input said deviation signal and a magnetic pole position signal from said magnetic pole position sensors;
   - whereby a shaft bearing mechanism comprises two sets of bearings including a spring disposed therebetween wherein a pre-load is provided by the magnetic attractive force between said rotor magnet and said yoke as well as the spring force of said spring.

2. A flexible-disc driving system according to claim 1, wherein said rotor magnet includes eight poles.

3. A flexible-disc driving system as in claim 1, wherein said rotor magnet is connected directly to the bottom side of said driving hub by way of a rotor frame.

4. A flexible-disc driving system as in claim 1, wherein said bearing mechanism compresses a first ball-bearing and a second ball-bearing, and said driving shaft is provided with at least two stepped-down portions along its shaft with a smaller diameter portion being positioned on the motor side, a medium diameter portion and a larger diameter portion being positioned on the driving hub side, and said first ball-bearing supporting the medium diameter portion of the driving shaft while said second ball-bearing supports the smaller diameter portion of the shaft respectively, and an outer side edge of an inner ring of said first ball-bearing being in contact with a stepped-down edge of the larger diameter portion of the driving shaft, and said spring being positioned between a side edge of an inner ring of the second ball-bearing and the side edge of the stepped-down portion on the smaller diameter part side of the driving shaft.

5. A flexible-disc driving system as in claim 1, wherein said motor case is made of a material possessing a high thermal conductivity.

6. A flexible-disc driving system as in claim 1, wherein said driving hub is equipped with heat radiating fins around its body.

7. A flexible-disc driving system as in claim 1, wherein said motor case and said motor mounting frame are composed in a solid one-piece structure made of a material possessing a high thermal conductivity.

* * * * *